United States Patent [19]
Fock et al.

[11] 4,002,781
[45] Jan. 11, 1977

[54] PROCESS FOR MAKING CARRIER SHEETS CONTAINING HARDENABLE POLYESTER RESINS

[75] Inventors: Jurgen Fock, Essen-Bredeney; Ulrich Holtschmidt, Essen, both of Germany

[73] Assignee: Th. Goldschmidt AG, Germany

[22] Filed: Dec. 28, 1971

[21] Appl. No.: 213,225

[30] Foreign Application Priority Data

Jan. 7, 1971 Germany .......................... 2100376
Nov. 26, 1971 Germany .......................... 2158679

[52] U.S. Cl. .............................. 427/340; 427/379; 427/385 B; 427/401
[51] Int. Cl.² .......................................... B05D 3/10
[58] Field of Search ............... 117/62.2, 76 P, 72, 117/161 K; 161/232, 261; 36/230; 260/850; 427/340, 407, 385, 379

[56] References Cited
UNITED STATES PATENTS

| | | | |
|---|---|---|---|
| 3,051,585 | 8/1962 | Weinberg | 117/72 |
| 3,309,327 | 3/1967 | Gayer | 260/850 |
| 3,402,219 | 9/1968 | Hill et al. | 117/161 K |
| 3,445,410 | 5/1969 | Coulter | 260/850 |
| 3,481,890 | 12/1969 | Guldenpfennig | 260/850 |
| 3,579,369 | 5/1971 | Foster | 117/62.2 |
| 3,668,277 | 6/1972 | Reimhofer et al. | 117/161 K |
| 3,704,161 | 11/1972 | Yamaguchi et al. | 117/161 K |

*Primary Examiner*—Ralph Husack
*Assistant Examiner*—Janyce A. Bell
*Attorney, Agent, or Firm*—James E. Bryan

[57] ABSTRACT

This invention relates to a process for making carrier sheets containing hardenable polyester resins by treating the carrier sheets with solutions or emulsions of polyester resins, which comprises a. impregnating the carrier sheet with an aqueous solution of a hardenable water-soluble polyester resin,
b. substantially drying the carrier sheet containing the aqueous solution of the hardenable polyester resin,
c. applying a polymerizable unsaturated compound onto the resin-containing carrier sheet in a quantity sufficient for subsequent cross-linking,
d. coating the treated resin-containing carrier sheet with a solution or an aqueous dispersion of a water-insoluble hardenable polyester resin containing a cross-linking agent, and
e. substantially drying the resultant product of the process.

14 Claims, No Drawings

PROCESS FOR MAKING CARRIER SHEETS CONTAINING HARDENABLE POLYESTER RESINS

The present invention relates to a process for making carrier sheets containing hardenable polyester resins by treating the carrier sheets with solutions or emulsions of polyester resins.

Used for tempering or heat-treating the surfaces of sheets of wooden material are especially carrier sheets or widths which are saturated or impregnated with hardenable condensation resins and which are pressed upon the surfaces of the sheets of wooden material under hardening conditions. Examples of such condensation resins are melamine-formaldehyde resins, urea-formaldehyde resins, or phenolformaldehyde resins, as well as mixtures thereof. These condensation resins have the advantage that they are water-soluble in the lower condensed condition thereof and are adapted to be applied from aqueous solutions on to the carrier sheets, generally consisting of paper. They do, however, have a number of disadvantages and drawbacks. In view of the fact that volatile compounds are split-off during the hardening operation, a relatively high contact pressure or pressing effect is necessary so that smooth surfaces are obtained. The condensation resins can be used only in relatively thin layers since the resultant hardened resin surfaces otherwise will be too susceptible to cracks or fissures. The hardening conditions must be most carefully adhered to, and particularly an over-heating must be prevented since this would lead to embrittlement of the resin layers. The carrier sheet saturated or impregnated with the condensation resins has only a limited flexibility and is relatively brittle.

These disadvantages are obviated, however, to a large extent by employing, in the place of condensation resins, resins which have olefinic double bonds and which are amenable to an additional polymerization. Such polymerizable resins, for example the hardenable- and hence unsaturated – polyester resins, harden fully without any splitting-off of volatile products. It is thus possible to employ lower contact pressures during the hardening operation without impairing the formation of a closed surface. A specific recooling after compression can be dispensed with, in contrast to the condensation resins. Resins being polymerizable due to the formation of double bonds have the additional advantage that they can be applied onto the surfaces of sheets of wooden material in greater thicknesses of the layers. The hardening conditions are not critical since there will be no excess hardening, and hence no embrittlement of the film. Another advantage of these polymerizable resins consists in that the carrier sheets containing the afore-mentioned resins are more flexible before the total or complete hardening, i.e. as semi-finished articles, than the corresponding semi-finished products manufactured by using condensation resins.

Difficulties arise, however in connection with the preparation of the carrier sheets being impregnated and charged with the polymerizable resins. Thus, it is necessary to add to the polymerizable resin, for example to the unsaturated polyester resin, an unsaturated compound that is capable of being polymerized and specifically in such an amount that the cross-linking thereof is guaranteed at elevated temperatures. One example of such a compound is styrene. If, however, hardenable polyester resins dissolved in styrene are applied onto carrier sheets, for example paper, tacky mutually adhering products are obtained from the process which require immediate processing. As a result, the semi-finished product cannot be stored but must be employed immediately for the surface treatment.

A degree of storability of these semi-finished products or articles can be achieved by covering the sheets with strippable foils. Another possibility consists in causing a degree of polymerization at the surface, for example by means of UV radiation according to Belgian Pat. No. 714,605. A premature, even if only partial polymerization of the starting products is not always desirable.

A further possibility for reducing the tackiness of the resulting surfaces obtained resides in that the viscosity of the polyester resins being dissolved in styrene is increased by the addition of finely divided magnesium oxide, in accordance with, for example, U.S. Pat. No. 2,628,209.

It is also possible to add small amounts of paraffin to the solution of the unsaturated polyester in styrene, according to German Pat. No. 948,816. During a preliminary polymerization, the paraffin is separated at the surface and assures a degree of decrease of the tackiness. The addition of products which are incompatible with the system, however, should be avoided as a general rule.

It is also possible, on the other hand, to employ solid cross-linking agents, such as for example acrylamide, diacetone acrylamide, or triallyl cyanurate. In that case, however, it is necessary to dissolve the unsaturated polyester resin and the cross-linking agent in an organic solvent or solvent mixture, such as for instance actone, methylene chloride, methylethylketone, or aromatic solvents. Webs of paper are customarily used as carrier sheets. Due to the hydrophilic nature of the cellulose fiber, however, the impregnation or saturation with organic solutions produces some difficulties. The dissolved synthetic resin penetrates only insufficiently into the hydrophilic fiber. A further disadvantage is the necessity for recovering the solvent employed in order that the economy of the process be assured, and this ecomony is additionally strained because of the fact that the saturating and drying installations must be constructed so as to be protected against explosions.

Attempts to use, instead of the organic solutions, aqueous dispersions of the hardenable polyester resins and of the cross-linking agents have been made in the past. Yet, such attempts have always failed in actual practice in view of the fact that the web of paper acts like a sieve so that the concentration in resin of the paper layer decreases toward the interior thereof. When such products are fully hardened, the water contained inside the carrier sheet can no longer escape prior to the formation of a closed surface. Bubbles are produced and, due to the low resin content in the center of the paper layer, a cracking of the paper will be the result.

It is further known from German Pat. No. 1,256,056 to modify aminoplast resins, for paper saturation or impregnation, with specific water-soluble polyesters having a complicated structure in order to impart to them, in so-called basic or primer foils, an improved adhesion or absorption for the subsequent varnishing.

It is the object of the present invention to obviate particularly the afore-described difficulties during the preparation of carrier sheets comprising unsaturated polyester resin, an above all to provide a process which assures an effective impregnation and coating of the carrier sheets which is at the same time simple to perform.

The object is achieved, in accordance with the present invention, in that a. the carrier sheet is impregnated with an aqueous solution of a hardenable water-soluble polyester resin;

b. the carrier sheet containing the aqueous solution of the hardenable polyester resin is substantially dried;

c. a polymerizable unsaturated compound is applied onto the resin-containing carrier sheet in a quantity sufficient for the subsequent cross-linking operation;

d. the thus treated resiniferous carrier sheet is coated with a solution or an aqueous dispersion of a water-insoluble hardenable polyester resin containing a cross-linking agent, and e. the product thus obtained from the process is substantially dried.

Employed as water-soluble polyester resins for the purpose of carrying out the inventive process are preferably reaction products of polyalkylene glycol diols with unsaturated dicarboxylic acids or the anhydrides thereof to which saturated carboxylic acids or anhydrides may be added, if desired. Particularly suitable as polyalkylene glycol diols are compounds having the general formula.

$$HO(CH_2CH_2O)_nH$$

wherein $n$ is preferably 2 to 8. Examples of $\alpha, \beta$-unsaturated dicarboxylic acids and the anhydrides thereof are fumaric acid and maleic anhydride. As has been set forth hereinabove, it is possible to admix to these acids or anhydrides other acids or anhydrides, such as, for example, phthalic anhydride, terephthalic acid, isophthalic acid, tetra- or hexhydrophthalic acid, succinic acid, adipic acid, and hexachlorendomethylene tetrahydrophthalic acid. The polyester resins are employed preferably in aqueous solutions of 10 to 50% by weight. When papers with a weight of approximately 80 g/m² are saturated or impregnated with aqueous solutions of the hardenable polyester resins at 30% by weight approximately, there will result a resin absorption of about 50 g/m². This resin absorption depends, of course, not only upon the concentration of the resin solution, but also upon the type of the paper and the type of saturation. In a paper having a weight per unit area of approximately 80 g/m², a resin absorption of about 30 to 70 g/m² should be sought in the first process step.

Employed as cross-linking agents for the water-soluble polyester resin are, preferably, monomeric vinyl, acrylic and/or allyl compounds. Examples of such polymerizable unsaturated compounds are styrene, substituted styrene, such as p-vinyltoluene for instance, also acrylic acid, acrylic and methacrylic ester, vinyl ester, acrylic and methacrylic amide, and diacetone acrylamide. Furthermore it is possible to employ di- and polyvinyl cross-linking agents such as divinyl benzene, trivinyl benzene, alkylene or alkylidene-bis-acrylamide, or the analogous acrylic esters, divinyl ether, divinyl sulfone, diallyl glycerin, glycerin trimethacrylate, triallyl cyanurate, diallyl adipate, diallyl phthalate, allyl acrylate, hexaalyl melamine, triacryl perhydrotriazine, and others.

The weight of cross-linking agent to water-soluble polyester resin should be approximately 1 : 1 to 1 : 3.

The cross-linking compound is applied onto the substantially dry carrier sheet containing the water-soluble polyester resin, either as such or from an aqueous dispersion, or from an organic solution. The latter, however, should be avoided, if at all possible. Styrene is a particularly important cross-linking agent; it is applied onto the film, dried beforehand, in the required amount and in liquid form, without a solvent.

Cross-linking catalysts and polymerization inhibitors are preferably added in conventional amounts to the cross-linking agent. Examples of such cross-linking catalysts are compounds which furnish radicals, which are as stable as possible at standard conditions but which cause polymerization and, respectively, cross-linking when heated, such as t-butyl perbenzoate, dicumene peroxide, cumene hydroperoxide, benzoyl peroxide, and t-butyl hydroperoxide in amounts of 0.1 to 0.3% by weight based upon the resin. Mixtures of different hardening catalysts also may be advantageously employed.

Examples of polymerization inhibitors are hydroquinone, t-butyl-catechol, benzoquinone, and di-tert.-butyl benzoquinone in amounts of about 0.001 to 0.5% by weight, based upon the polyester. These polymerization inhibitors guarantee the storability of the products of this process.

Used as water-insoluble polyesters are preferably reaction products of alkylene glycols with unsaturated dicarboxylic acids or the anhydrides thereof to which saturated dicarboxylic acids or anhydrides may be added.

Examples of $\alpha, \beta$-unsaturated dicarboxylic acids and the anhydrides thereof are again fumaric acid or maleic anhydride. Used as bivalent alcohols are particularly ethylene glycol, propane diol (1,2), propane diol (1,3), butane diol (1,4) or 2,2-dimethyl-propane diol (1,3).

The coating of the carrier sheet, which is impregnated in the first process step with water-soluble polyester resin and in the second process step with the cross-linking agent, may be carried out with the water-insoluble polyester resin either in a solution in an organic solvent, or with an aqueous dispersion of the water-insoluble hardenable polyester resin. The preference in this connection will be the aqueous dispersion since the elimination of solvents is one object of the process according to the present invention so that all the process steps if possible can be carried out with the use of water as a solvent or as a closed phase in the case of a dispersion.

The solution or aqueous dispersion of the water-insoluble hardenable polyester resin already expediently contains the cross-linking agent needed for hardening. Here again, the same cross-linking agents which have been enumerated hereinabove can be used. When using liquid cross-linking agents, such as styrene, for example, they may serve at the same time as a solvent for the polyester resin, and the dispersion in water is prepared from the solution of the polyester resin in the cross-linking agent. The cross-linking agent may be admixed with the water-insoluble polyester resin or may be chemically bonded to the polyester resin. If the cross-linking agent is admixed, a prepolymerizate capable of being cross-linked also may be employed instead of the monomers of being polymerized. One example of a preferably used prepolymerizate is a diallyl phthalate prepolymerizate.

The cross-linking agent also may be chemically bound or bonded to the polyester resin. A preferred example of a chemically bonded cross-linking agent is styrene. The in-polymerization of the cross-linking agents has been described, for example, in German Auslegeshrift 1,136,486. This Auslegeschrift disclosed the in-polymerization in an organic solvent. It has been found, however, that the in-polymerization is possible also in an aqueous dispersion.

Cross-linking catalysts and polymerization inhibitors may be added in conventional amounts to the water-insoluble polyester resin in the same manner as to the water-soluble polyester resin.

It has been indicated hereinabove, in connection with the example of a paper having a weight of 80 g/m$^2$, that a resin absorption of water-soluble polyester resin of approximately 50 g/m$^2$ is to take place in the first process step. The resin absorption during the coating with the water-insoluble polyester resin should amount to approximately 50 to 100 g/m$^2$.

The carrier sheets made according to the process of the present invention have excellent properties with regard to the application techniques thereof, and specifically by virtue of their excellent resin saturation or impregnation and coating. They may be pressed in a simple manner upon sheets of wooden materials and result in high-gloss transparent surface layers which have excellent chemical and mechanical resistance. The pressing of the products from this process upon wooden material sheets can take place at a pressure of 5 to 15 kg/cm$^2$, and at temperatures of 120 to 150° C.

In contrast to the process described in German patent 1,256,056, the satuation or impregnation and the coating is made with the same class of resins. This results in an excellent bond between the individual resinous layers being applied.

In a variation and further development of the above-indicated process it has been found that particularly advantageous products are arrived at when the carrier sheet is saturated or impregnated with the aqueous solution of a hardenable water-soluble polyester resin, the aqueous solution additionally containing the unetherified hardenable melamine-formaldehyde precondensates in such amounts that the weight ratio of polyester resin to melamine-formaldehyde precondensation resin is 0.5 : 1.5 to 1.5 : 0.15.

In this connection it was surprising that, despite the known incompatibility of polyester resins and unetherified melamine-formaldehyde procondensation resins, no turbidities are produced in the hardened film, but clearly transparent resin layers are obtained instead. Turbidities will, however, arise beyond the weight ratios indicated above.

The inventive admixture of an unetherified melamine resin to the water-soluble unsaturated polyester resin, which is employed for the preliminary impregnation, renders it possible to dispense with an unsaturated compound capable of being polymerized and which is to be applied after the preliminary impregnation and drying of the carrier sheet, as described above. This allows for and renders possible a further simplification of the process.

It constitutes a particular technical advance to have found that by virtue of the addition of the melamine-formaldehyde precondensation resin during the saturation or impregnation, the tendency toward splitting of the hardened carrier sheet, to the extent that it consists of paper, disappears either to a large extent or completely, whereas in papers which have been impregnated exclusively with polyesters, a more or less marked cleavability within the surface layers is noticeable at all times after the pressing operation. As a result, the mechanical stability of the surfaces of the treated material plates, particularly plates from wooden material, is increased considerably.

A further advantage resides in the fact that the hardened melamine-formaldehyde resin acts as a barrier as it were for the water-insoluble polyester resin applied during the process step d); i.e. during the pressing of the products. The danger that the water-insoluble polyester resin will sink or sag into the underlying strata, thereby possibly resulting in flaws or defects in the surface of the treated film is reduced or eliminated.

An additional process step may consist in that the mixture of the aqueous solution of the unsaturated polyester and of the unetherfied melamine resin is reacted wih small amounts of monoethanolamine, for example 0.1 to 5% by weight, based upon the solid resins. This reduces considerably the danger of too short a stability of the common aqueous solution, while still not resulting in any disadvantages for the further processing or the properties of the finished article or product.

In addition thereto it is possible and advantageous to add a latent heat hardener conventional in aminoplast chemistry. Examples of such hardeners are sodium chloroacetate, N-methyl-ethanol ammonium acetate, and morpholine-p-toluene sulfonate. The hardener may be present in a quantity of 0.001 to 1.0 percent by weight, based on the content of melamine resin.

The inventive process will now be further described hereinafter on the basis of the following examples.

EXAMPLE 1 a. Preparation of a water-soluble polyester 370 parts by weight of octa-ethylene glycol, 98 parts by weight of maleic anhydride, and 5 parts by weight of p-toluene sulfonic acid are esterified in a conventional manner by condensation in the melt with passage of carbon dioxide and a gradual increase in temperature to 220° C. With the increasing condensation time, the viscosity of the melt also increases progressively, although no further esterification water passes over. The condensation is terminated approximately two hours after the last water has passed over, and a yellow-colored viscous oil is obtained with an acid number of 10; it is completely miscible with water.

b. Saturation with water-soluble polyester 30 parts by weight of the water-soluble polyester are dissolved in 70 parts by weight of water. Saturated or impregnated with this solution is a decorative paper whose weight per unit area is 80 g/m$^2$. After evaporation of the water there results a weight per unit area of 130g/m$^2$. Additionally applied thereafter is stryene to which, per 100 parts by weight, 3 parts by weight of t-butyl perbenzoate and 0.2 part by weight of hydroquinone had been added. The weight per unit area of the film thus increases to 155 g/m$^2$.

c. Preparation of a water-insoluble polyester 236 parts by weight of propane diol (1,2), 196 parts by weight of maleic anhydride, and 166 parts by weight of phthalic acid are esterified in the conventional manner with 5 parts by weight of p-toluene sulfonic acid by condensation in the melt with passage of carbon dioxide and a gradual increase in temperature to 220° C. The esterification is continued up to an acid number of 15. 60 parts by weight of this polyester are stirred with 40 parts by weight of stryrene and stabilized with 0.01 part by weight of hydroquinone.

d. Preparation of a polyester-styrene prepolymerizate 300 parts by weight of methylene chloride, 150 parts by weight of the polyester-styrene mixture indicated under 1 (c) above, 0.3 part by weight of isopropyl percarbonate, and 1 part by weight of benzoyl peroxide are heated to the boiling point while stirring and while introducing nitrogen. After some time, a turbidity occurs and the viscosity increases. Added at this point are 0.01 part of hydroquinone dissolved in 20 parts by weight of ethyl acetate, and the mixture is cooled to 0° C. From the resulting solution of the prepolymerizate, so much is evaporated that a solids content of 50% will result.

e. Saturation with the polyester-styrene prepolymerizate

The film obtained according to 1 (b) above is saturated or impregnated with the solution of the prepolymerizate, having been reacted with 2 parts by weight of benzoyl peroxide per 100 parts by weight. The weight per unit area of the film now is 230 g/m². The film is almost free from tackiness and may be stored for several weeks.

f. Pressing of the foil on to a wooden material

The foil is pressed upon a sheet of veneer with the aid of a chromium sheet and a pressing pad at a pressure of 8 kg/cm² and a temperature of 135° C. A high-gloss surface is obtained which is resistant to organic solvents and water, and which is scratch-resistant as well.

EXAMPLE 2

The procedure is the same as described above for Example 1, modified merely by the preparation of the prepolymerizate (1d). Dissolved initially are 150 parts by weight of the polyester-styrene mixture in 300 parts by weight of ethyl acetate with the addition of 1.5 parts by weight of tert.-butyl hydroperoxide and 0.25 part by weight of benzoyl peroxide After a turbidity has occured, the polymerization is terminated by the addition of 0.01 part by weight of hydroquinone in 20 parts by weight of ethyl acetate. Additionally stirred in thereinafter are 150 parts by weight of deionized water and 6 parts by weight of p-tert.-octyl-phenoxy-polyethylene glycol-ether, and the organic solvent is removed by evacuation with heating so that a stable aqueous emulsion is obtained. The emulsion being reacted with 3 grams of tert.-butyl perbenzoate is applied onto the previously saturated paper, and the water is removed with heating. There results an almost non-tacky film which is stable in storage. The surface of the film pressed onto a veneer plate at 8 kg/cm² and 135° C is scratch-resistant and stable against organic solvents and water.

EXAMPLE 3 a. Preparation of a water-soluble polyester 190 parts by weight of tetraethylene glycol, 98 parts by weight of maleic anhydride, and 3 parts by weight of p-toluene sulfonic acid are esterified as indicated in Example 1. The acid number of the product is 12.

b. Saturation with water-soluble polyester 30 parts by weight of the water-soluble polyester are dissolved in 70 parts by weight of water. Saturated with this solution is a decorative paper whose weight per area is 75 g/m². After evaporation of the water, there results a weight per unit area of 125 g/m². Thereafter the saturation is made with styrene to which, per 100 parts by weight, 3 parts by weight of tert.-butyl perbenzoate and 0.2 part by weight of hydroquinone were added. The weight per unit area thus increases to 150 g/m².

c. Preparation of a water-insoluble polyester

The preparation is effected as indicated above in Example 1(c).

d. Prepolymerization of a mixture of water-insoluble polyester and styrene 60 parts by weight of polyester are reacted with 40 parts by weight of styrene, 1 part by weight of tert.-butyl perbenzoate, 1.5 parts by weight of isopropyl benzoin ether, 0.2 part by weight of paraffin and 2 parts by weight of magnesium oxide. The film obtained according to (b) is saturated with this solution and there will result a final weight of 240 g/m². The film is radiated with an UV lamp (Philips TLM 120 W/OSRS) at a distance of 10 centimeters for 2 minutes, at which time it becomes almost free from tackiness while still remaining capable of flowing.

e. Pressing of the foil on a material from wood

The foil is pressed on a veneered plate with the aid of a chromium plate and a pressing pad at a pressure of 8 kg/cm² and at a temperature of 140° C. A high-gloss solvent- and water-resistant and scratch-resistant surface is thereby obtained.

EXAMPLE 4 a. Preparation of a water-soluble polyester 190 parts by weight of tetraethylene glycol, 74 parts by weight of phthalic anhydride and 49 parts by weight maleic anhydride are esterfied as indicated in Example 1 (a) with the addition of 2 parts by weight of p-toluene sulfonic acid. The acid number of the product is 15.

b. Saturation with water-soluble polyester 30 parts by weight of the water-soluble polyester are dissolved in 70 parts by weight of water. Saturated with this solution is a decorative paper whose weight per unit area is 80 g/m². After the evaporation of the water, there will result a weight per unit area of 119 g/m². Thereafter saturation with diallyl phthalate is effected to which latter, per 100 parts by weight, 3 parts by weight of tert.-butyl-perbenzoate and 0.2 part by weight of hydroquinone had been added. The weight per unit area thus increases to 137 g/m².

c. Preparation of a water-insoluble polyester

The preparation is made as indicated in Example 1 (c).

d. 120 parts by weight of the water-insoluble polyester are dissolved together with 60 parts by weight of diallyl phthalate prepolymerizate and 4 parts by weight of tert.-butyl perbenzoate in 180 parts by weight of methylene chloride. The film obtained according to 4 (b) is saturated with this solution. After the evaporation of the solvent, there results a weight per unit area of 215 g/m². The film is free from tackiness and can be stored for several weeks.

e. Pressing of the film on a wood material

The film is pressed on a veneer plate with the aid of a separating paper and a pressing pad at a pressure of 8 kg/cm² and at a temperature of 135° C for 10 minutes. A dull, scratch-resistant, solvent- and water-resistant surface is thereby obtained.

EXAMPLE 5 a. Preparation of a water-soluble polyester 370 parts by weight of octa-ethylene glycol, 98 parts by weight of maleic anhydride, and 5 parts by weight of p-toluene sulfonic acid are esterified in the conventional manner by condensation in the melt while passing carbon dioxide and with a gradual temperature increase to 220° C. As a result of the increasing condensation duration, the viscosity of the melt increases constantly although no further esterification water passes over. The condensation is terminated approximately two hours after the last water has passed over, and a yellow-colored viscous oil is obtained with an acid number of 10; it is completely miscible with water.

b. Preparation of a melamine-formaldehyde preliminary condensate

A melamine-formaldehyde preliminary condensate completely misicible with water is made in the conventional manner by alkaline condensation of melamine and formaldehyde in a molar ratio of 1 : 2.

c. Preparation of a preliminary impregnation or saturation mixture 30 parts by weight of the polyester obtained according to (a) are mixed with 30 parts by weight of a 55% aqueous solution of melamine-formaldehyde precondensate and 1.3 parts by weight of ethanolamine.

d. Saturation with a mixture of water-soluble polyester and melamine formaldehyde precondensate Saturated with the mixture indicated under (c) above is a decorative paper on both sides thereof whose weight per unit area is 80 g/m². After evaporation of the water, there results a weight per unit area of the saturated or impregnated film of 130 g/m².

e. Preparation of a water-insoluble polyester

A polyester of 1 mole of phthalic acid, 1 mole of maleic anhydride and 2.05 moles of propylene glycol-1,2 is made in the conventional manner by condensation of the components in the presence of 1% by weight of p-toluene sulfonic acid at temperatures of 150° to 220° C. An acid number of 30 is obtained.

f. Preparation of a polyester prepolymerizate 65 parts by weight of the polyester are dissolved in 35 parts by weight of styrene and stabilized with 0.01 part by weight of hydroquinone. Added to 100 parts by weight of this solution are 0.165 part by weight of benzoyl peroxide, 1 part by weight of t-butyl hydroperoxide and 1 part by weight of octyl phenyl polyethylene glycol. Added to this mixture is a suspension of 2 parts by weight of finely-divided silica in 82 parts by weight of water while stirring rapidly with an agitator having a high shearing stress.

Prepared simultaneously is a dispersion of solid, diallyl phthalate prepolymerizate in water, obtained according to German patent 1,067,216. This is done by dissolving 100 parts by weight of diallyl phthalate prepolymerizate in 75 parts by weight of methylene chloride and adding to this solution 2 parts by weight of octyl-phenyl polyethylene glycol and 100 parts by weight of water, which contain 2.5 parts by weight of a copolymer of styrene and sodium maleinate (1:1), and by subsequently distilling off the organic solvent by heating to 60° C. Produced is a stable dispersion with a DIN-beaker-viscosity (DIN 53 211) of 80 seconds (20 C).

20 parts by weight of the diallyl phthalate prepolymerizate dispersion are added to the above-indicated polyester-styrene dispersion; the resultant mixture is adjusted to a pH value of about 6 with the aid of a 5% aqueous ammonia solution, and lastly added are 5 parts by weight of 1,2-dichloroethane. The dispersion obtained in this manner is heated, in a three-necked flask which is equipped with a stirrer and a reflux cooler, to 70° C while nitrogen is being introduced. After 55 minutes, 0.01 part by weight of hydroquinone is added and cooling to room temperature is rapidly effected. Obtained is a dispersion which is stable for several days and whose DIN-beaker-viscosity is 45 seconds.

The dispersed prepolymerizate is soluble in benzene, methylene chloride, ethyl acetate, acetone, and the like. The limit viscosity (chloroform/20° C) is 0.8 100 ml · g⁻¹.

g. Saturation or impregnation with the aqueous polyester prepolymerizate dispersion The film obtained according to (d) is saturated or impregnated with the dispersion of the prepolymerizate cross-linked with 2.5 parts by weight of t-butyl perbenzoate per 100 parts by weight; the weight per unit area of the film drying thereof is 250 g/m². The film is almost free from tackiness and is storable for several weeks.

g. Pressing the foil on a wooden material

The film is pressed on a veneer plate with the aid of a chromium sheet and a pressing pad at a pressure of 8 kp/cm² and at a temperature of 135° C. A high-gloss surface is obtained which is scratch-resistant and has a pendulum hardness of 120 seconds (DIN 53 157). The pressed film is resistant against a 5% hydrochloric acid solution and against acetic acid and is only slightly affected by a 10% solution of caustic soda. Upon the influence or action of methylene chloride, a slight attack becomes evident after 30 minutes. The film is resistant to a large extent against acetone, ethyl acetate and toluene.

Steam shows no effect; no turbidity will result. Storage at 80° C for 24 hours will not alter the film. The pressed film is distinguished by a remarkable resistance against the splitting or cleavability of paper.

It will be obvious to those skilled in the art that many modifications may be made within the scope of the present invention without departing from the spirit thereof, and the invention includes all such modifications.

What is claimed is:

1. A process for making carrier sheets containing hardenable polyester resins by treating the carrier sheets with solutions or emulsions of polyester resins, which comprises
  a. impregnating the carrier sheet with an aqueous solution of a hardenable water-soluble polyester resin,
  b. substantially drying the carrier sheet containing the aqueous solution of the hardenable polyester resin,
  c. applying a polymerizable unsaturated compound as a cross-linking agent onto the resin-containing carrier sheet in a quantity sufficient for subsequent cross-linking,
  d. coating the treated resin-containing carrier sheet with a solution or an aqueous dispersion of a water-insoluble hardenable polyester resin containing a cross-linking agent, and
  e. substantially drying the resultant product of the process.

2. A process according to claim 1, in which the water-soluble polyester resins are reaction products of polyalkylene glycol diols with unsaturated dicarboxylic acids or the anhydrides thereof.

3. A process according to claim 1, in which the cross-linking agent of step (c) for the water-soluble polyester resin is at least one monomeric vinyl-, acryl-, or allyl-compound.

4. A process according to claim 3, in which cross-linking catalysts and polymerization inhibitors in conventional quantities are added to the cross-linking agent of step (c).

5. A process according to claim 1, in which the water-insoluble polyesters are reaction products of alkylene glycols with unsaturated dicarboxylic acids or the anhydrides thereof.

6. A process according to claim 1, in which the water-insoluble polyester resin contains the cross-linking agent admixed or chemically bonded therewith.

7. A process according to claim 6, in which the admixed cross-linking agent is a monomer adapted to be polymerized in or a prepolymerizate capable of being cross-linked.

8. A process according to claim 7, in which the monomer is styrene.

9. A process according to claim 7, in which the prepolymerizate is a diallyl phthalate prepolymerizate.

10. A process according to claim 7, in which the chemically bonded cross-linking agent is styrene.

11. A process according to claim 1, in which the solution or emulsion of the water-insoluble polyester resin contains cross-linking catalysts and polymerization inhibitors in conventional quantities.

12. A process for making carrier sheets containing hardenable polyester resins by treating the carrier sheets with solutions or emulsions of polyester resins, which comprises
  a. impregnating the carrier sheet with an aqueous solution of a hardenable water-soluble polyester resin containing at least one unetherified melamine-formaldehyde precondensate in a weight ratio of 0.5 – 1.5 to 1.5 – 0.15,
  b. substantially drying the carrier sheet containing the aqueous solution of the hardenable polyester resin,
  c. coating the treated resin-containing carrier sheet with a solution or an aqueous dispersion of a water-insoluble hardenable polyester resin containing a cross-linking agent, and
  d. substantially drying the resultant product of the process.

13. A process according to claim 12 in which the solution of polyester resin and melamine-formaldehyde precondensate additionally contains 0.1 to 5 percent by weight of monoethanolamine, based on the solid resin content.

14. A process according to claim 12 in which the solution of polyester resin and melamine-formaldehyde precondensate additionally contains 0.001 to 1.0 percent by weight, based on the content of melamine resin, of a latent hardener for the melamine-formaldehyde precondensate.

* * * * *